(12) United States Patent
Kojima et al.

(10) Patent No.: US 7,993,060 B2
(45) Date of Patent: Aug. 9, 2011

(54) SEAT SLIDE APPARATUS FOR VEHICLE

(75) Inventors: Yasuhiro Kojima, West Bloomfield, MI (US); Hideo Nihonmatsu, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 499 days.

(21) Appl. No.: 12/187,694

(22) Filed: Aug. 7, 2008

(65) Prior Publication Data

US 2009/0080814 A1    Mar. 26, 2009

(30) Foreign Application Priority Data

Sep. 21, 2007    (JP) ................................. 2007-245626

(51) Int. Cl.
*F16C 29/02* (2006.01)
*B60N 2/07* (2006.01)
(52) U.S. Cl. .............................. 384/47; 384/34; 248/429
(58) Field of Classification Search ............... 384/18–21, 384/34, 47; 248/424, 429, 430
See application file for complete search history.

(56) References Cited

U.S. PATENT DOCUMENTS

| | | | |
|---|---|---|---|
| 5,224,781 A * | 7/1993 | Rohee ............................. | 384/34 |
| 5,529,397 A * | 6/1996 | Yoshida .......................... | 384/47 |
| 6,089,521 A * | 7/2000 | Tarusawa et al. ............. | 248/430 |
| 6,427,962 B1 * | 8/2002 | Rohee et al. ................... | 248/424 |
| 6,464,194 B1 * | 10/2002 | Armo ............................. | 248/430 |
| 6,926,443 B2 * | 8/2005 | Niimi et al. ..................... | 384/34 |
| 7,439,735 B2 * | 10/2008 | Barnabo et al. ........... | 324/207.26 |
| 7,521,924 B2 * | 4/2009 | Okumura et al. ........ | 324/207.24 |
| 7,637,469 B2 * | 12/2009 | Yamada et al. ............... | 248/430 |
| 2002/0060281 A1 * | 5/2002 | Okazaki et al. ............... | 248/424 |
| 2005/0224680 A1 * | 10/2005 | Strubel et al. ................. | 248/429 |
| 2007/0090230 A1 * | 4/2007 | Yamada et al. ............... | 246/1 R |
| 2007/0090263 A1 * | 4/2007 | Yamada et al. ............... | 248/429 |
| 2007/0108748 A1 * | 5/2007 | Ventura et al. ................ | 280/735 |
| 2008/0129017 A1 * | 6/2008 | Okazaki et al. ............... | 280/727 |
| 2008/0309136 A1 * | 12/2008 | Kojima et al. ................ | 297/340 |
| 2009/0102224 A1 * | 4/2009 | Rohee et al. ................. | 296/65.14 |
| 2010/0133407 A1 | 6/2010 | Fujieda et al. | |

FOREIGN PATENT DOCUMENTS

| | | | |
|---|---|---|---|
| DE | 10 2004 030 282 A1 * | 1/2006 | |
| FR | 2 847 530 A1 | 5/2004 | |
| JP | 2006-298104 | 11/2006 | |

* cited by examiner

*Primary Examiner* — Marcus Charles
(74) *Attorney, Agent, or Firm* — Oblon, Spivak, McClelland, Maier & Neustadt, L.L.P.

(57) ABSTRACT

A seat slide apparatus for a vehicle includes a first rail adapted to be securely mounted on one of a vehicle floor and a seat, a second rail adapted to be securely mounted on the other of the vehicle floor and the seat and movably assembled relative to the first rail, a first bent portion formed at the first rail, a pair of second bent portions respectively formed at the second rail at longitudinal sides of the first bent portion of the first rail so as to contact the first bent portion to restrict further relative movement of the first and second rail, and a relief portion provided at one of the first and second rails so as to face one of the second and first bent portions, respectively.

7 Claims, 5 Drawing Sheets

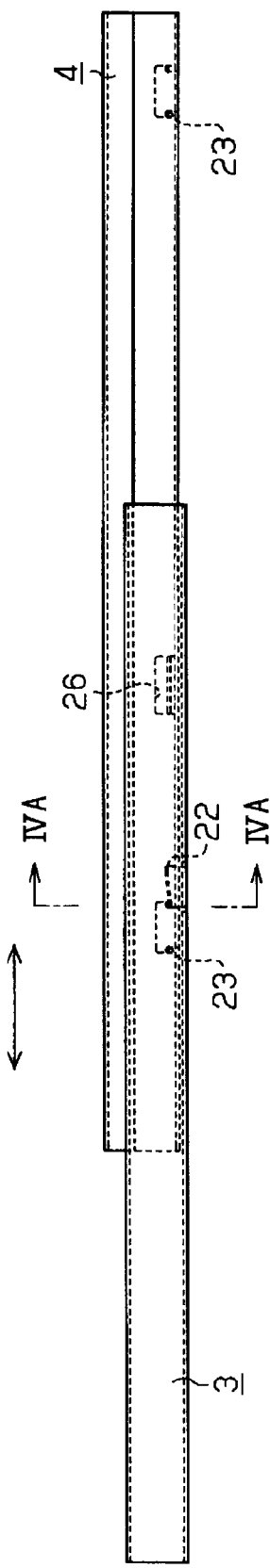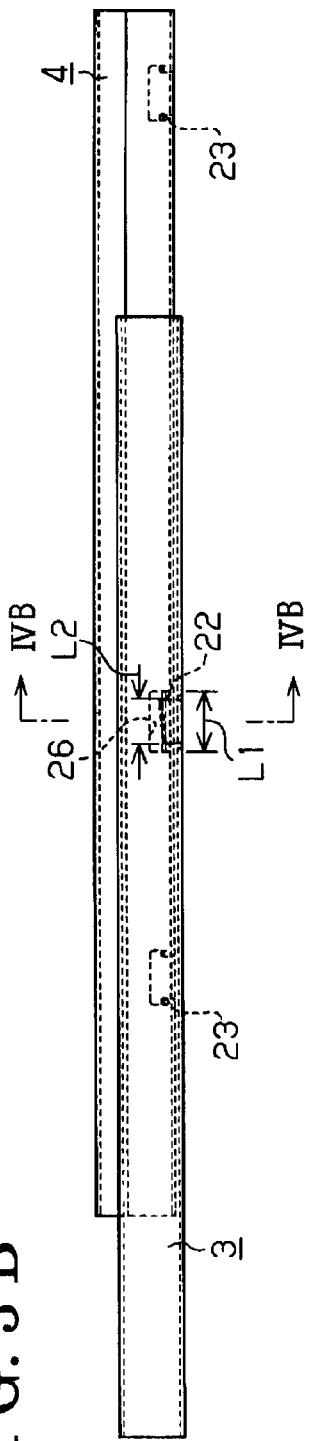
FIG. 3A
FIG. 3B

SEAT SLIDE APPARATUS FOR VEHICLE

CROSS REFERENCE TO RELATED APPLICATIONS

This application is based on and claims priority under 35 U.S.C. §119 to Japanese Patent Application 2007-245626 filed On Sep. 21, 2007, the entire contents of which is incorporated herein by reference.

FIELD OF THE INVENTION

The present invention relates to a seat slide apparatus for a vehicle.

BACKGROUND

A known seat slide apparatus for a vehicle is disclosed in JP2006-298104A, which is hereinbelow referred to as reference 1. The seat slide apparatus disclosed in the reference 1 includes a lower rail and an upper rail. The lower rail is secured to a vehicle floor. The upper rail is secured to a vehicle seat and movably supported relative to the lower rail. A bent portion is provided at an intermediate portion of the longitudinal direction of the lower rail. The bent portion is formed by cutting and upwardly bending a bottom portion of the lower rail in an inclined manner. On the other hand, first and second bent portions are provided at front and rear ends of the upper rail, respectively. The first and second bent portions are formed by cutting and downwardly bending a sidewall portion of the upper rail in an inclined manner. A side surface of the first bent portion of the upper rail and one side surface of the bent portion of the lower rail are arranged to face each other in a moving direction of the upper rail and to partly make contact with each other. In the same manner, a side surface of the second bent portion of the upper rail and another side surface of the bent portion of the lower rail are arranged to face each other in a moving direction of the upper rail and to partly make contact with each other. In accordance with a sliding movement of the upper rail, the first and second bent portions of the upper rail engage with the bent portion of lower rail in order to restrict a moving distance of the upper rail relative to the lower rail.

According to the seat slide apparatus for a vehicle disclosed in the reference 1, the upper and lower rails are assembled to each other so as to be relatively movable before forming the bent portion of the lower rail, for example. In such a state, the bent portion of the lower rail is formed between the first and second bent portions of the upper rail. In this case, when forming the bent portion of the lower rail, the upper rail interferes with the bent portion of the lower rail therefore preventing the bent portion of the lower rail from being bent sufficiently. Specifically, the lower rail made of metal may not be bent sufficiently because of a springback effect when forming the bent portion of the lower rail. Therefore, sufficient degree of engagement between each of the first and second bent portions of the upper rail and the bent portion of the lower rail may not be obtained, thereby a moving distance of the upper rail relative to the lower rail may not be surely restricted.

On the other hand, when the bent portion of the lower rail is bent excessively in order to obtain the sufficient degree of the engagement, the upper rail may receive a load generated when forming the bent portion of the lower rail. In such a case, dimensional accuracy may decrease, which may cause the upper and lower rails not to be movable relative to each other.

A need thus exists for a seat slide apparatus for a vehicle, which is not susceptible to the drawback mentioned above.

SUMMARY OF THE INVENTION

A seat slide apparatus for a vehicle includes a first rail adapted to be securely mounted on one of a vehicle floor and a seat, a second rail adapted to be securely mounted on the other of the vehicle floor and the seat and movably assembled relative to the first rail, a first bent portion formed at the first rail, a pair of second bent portions respectively formed at the second rail at longitudinal sides of the first bent portion of the first rail so as to contact the first bent portion to restrict further relative movement of the first and second rail, and a relief portion provided at one of the first and second rails so as to face one of the second and first bent portions, respectively.

BRIEF DESCRIPTION OF THE DRAWINGS

The foregoing and additional features and characteristics of the present invention will become more apparent from the following detailed description considered with the reference to the accompanying drawings, wherein:

FIG. 3A is a side view illustrating the upper and lower rails mounted to each other according to the embodiment;

FIG. 3B is a side view illustrating the upper and lower rails arranged at a predetermined relative relationship;

DETAILED DESCRIPTION

Figure 1:
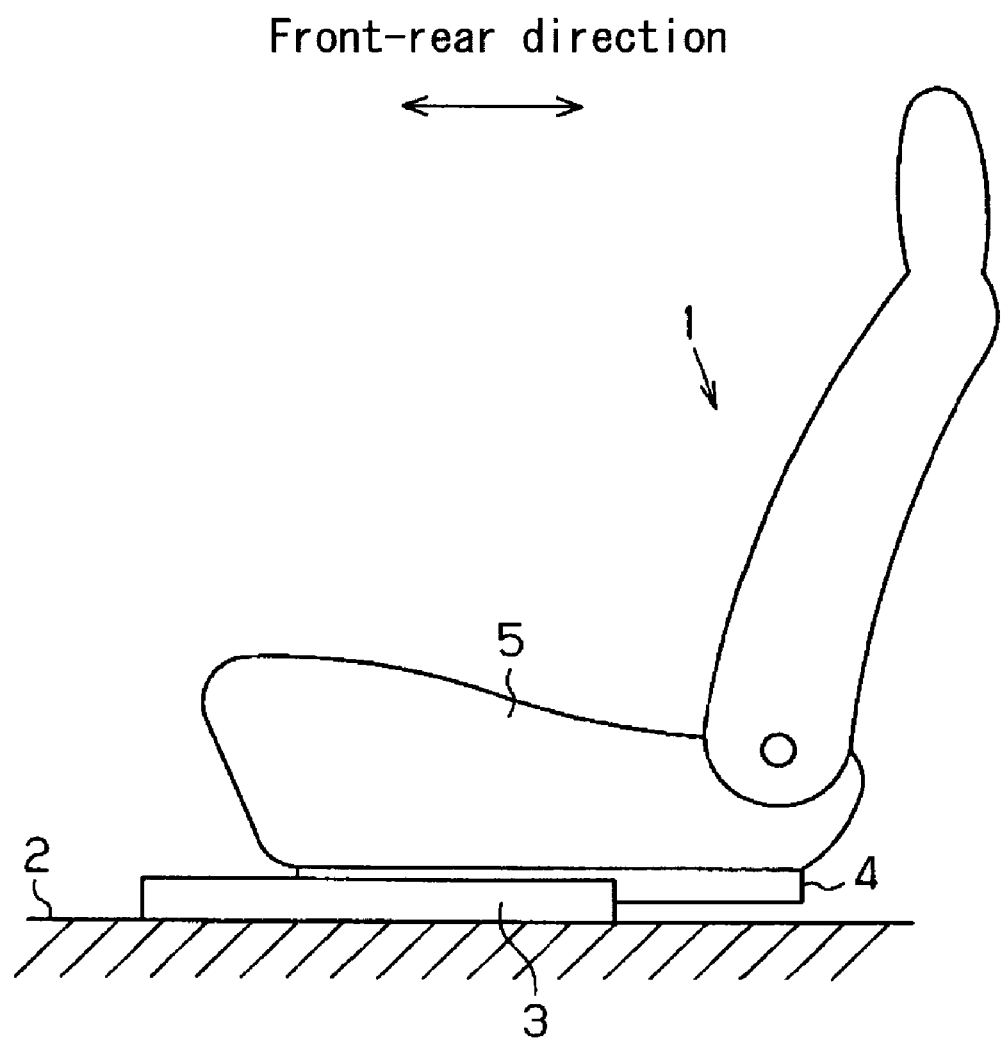
FIG. 1 is a side view illustrating a seat for a vehicle according to an embodiment of the present invention.
Figure 2:
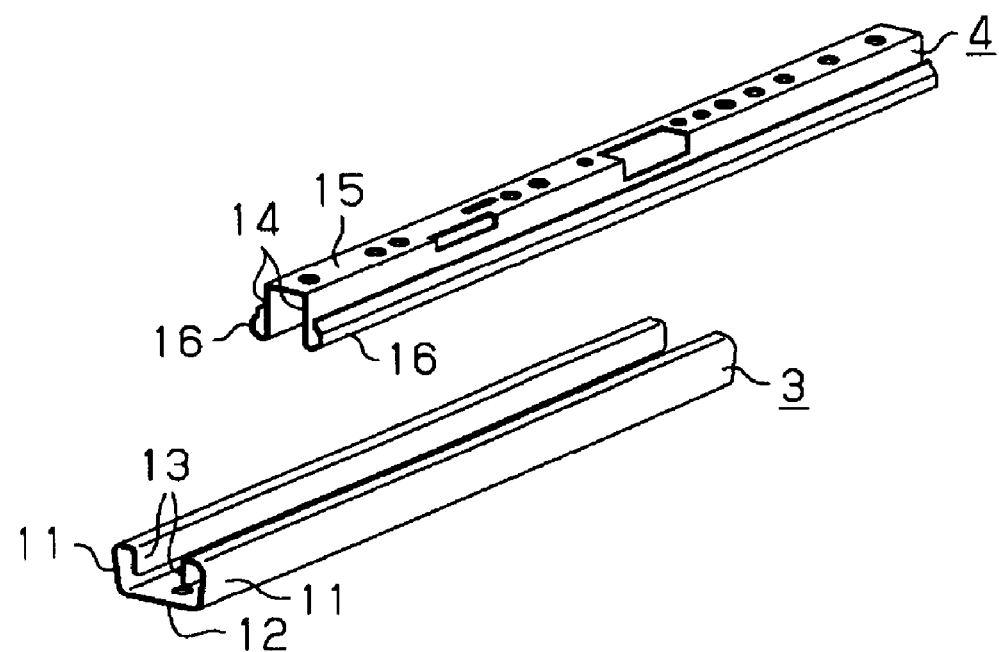
FIG. 2 is an exploded perspective view illustrating upper and lower rails according to the embodiment.

An embodiment of a seat slide apparatus for a vehicle according to the present invention is described hereinbelow with reference to attached drawings. FIG. 1 is a side view schematically illustrating a vehicle seat 1, which is mounted on a vehicle such as an automobile, or the like. As illustrated in FIG. 1, a metal-made lower rail 3 (serving as a first rail) is fixedly secured to a vehicle floor 2 so as to extend in a longitudinal direction of the vehicle. A metal-made upper rail 4 (serving as a second rail) is movably assembled relative to the lower rail 3.

Two sets of the lower rails 3 and the upper rails 4 are provided at left and right side portions of the vehicle seat 1 (at side portions of the vehicle seat 1 in a width direction), respectively. Here, a left side set of lower rail 3 and upper rail 4, which is provided at the left side portion relative to a front direction of the vehicle seat 1, is illustrated in FIG. 1. Here the two sets of (the right side and left side) lower rails 3 and upper rails 4 include approximately the same configuration. Therefore, the structure and functions of the two sets of (the right side and left side) lower rails 3 and upper rails 4 will be described below with one set of lower rail 3 and one upper rail 4 for an explanatory purpose. A seat 5 forming a sitting portion for an occupant is fixedly secured to the left and right upper rails 4. A lock member (not illustrated in the drawings) normally restricts a relative movement of the upper and lower rails 3 and 4, and the restriction is released by applying operating force to the lock member.

Next, the seat slide apparatus for a vehicle according to the embodiment is described hereinbelow with reference to, FIGS. 2 to 5. Hereinbelow, directions, such as longitudinal (front and rear), vertical, lateral (right and left), or the like, correspond to an orientation of the seat for the vehicle.

Figure 4A:
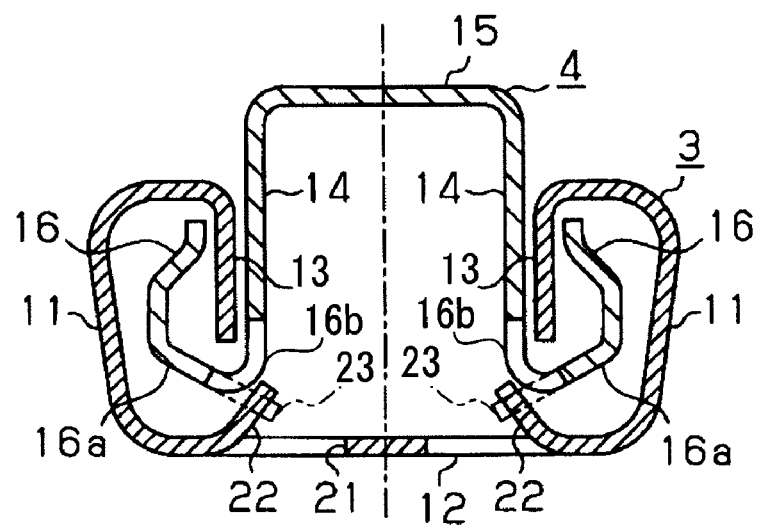
FIG. 4A is a cross-sectional view taken along line IVA-IVA in FIG. 3A
Figure 4B:
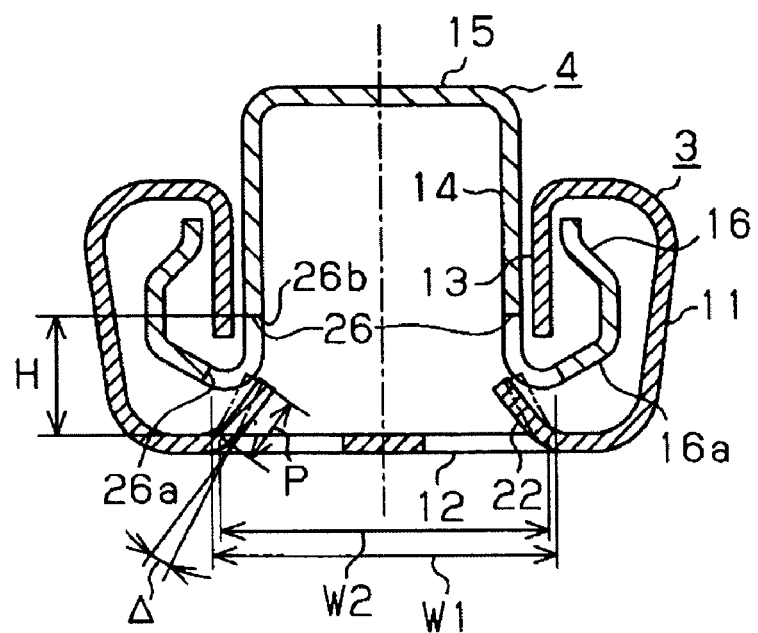
FIG. 4B is a cross-sectional view taken along line IVB-IVB in FIG. 3B.

As illustrated in FIGS. 4A and 4B, the lower rail 3 includes a pair of side wall portions 11 (serving as first side wall portions) and a bottom wall portion 12 (serving as a first base wall portion). The side wall portions 11 are provided at both lateral ends (i.e., ends in a width direction) of the bottom portion 12, respectively. The bottom portion 12 connects the side wall portions 11. A pair of bent wall portions 13 (serving as first bent wall portions) is successively formed at corresponding top ends of the side wall portions 11. Each of the bent wall portions 13 is bent inwardly in the width direction and further bent downwardly towards a bottom portion of the corresponding side wall portion 11.

On the other hand, the upper rail 4 includes a pair of side wall portions 14 (serving as second side wall portions) and an upper wall portion 15 (serving as second base wall portion). The side wall portions 14 extend in a vertical direction between the side wall portions 13 of the lower rail 3. The upper wall portion 15 connects the side wall portions 14. Further, a pair of bent wall portions 16 (serving as second bent wall portions) is successively formed from corresponding bottom ends of the side wall portions 14. The bent wall portions 16 are bent outwardly in the width direction of the vehicle in a manner in which the bent wall portions 16 are surrounded by the corresponding side wall portions 11 and bent wall portions 13. Bottom end portions of the bent wall portions 16 incline upwardly from corresponding connecting portions 16b between the side wall portions 14 and the bent portions 16 to form a pair of side wall portions 16a.

In other words, when seen in the cross-sectional view, the upper and lower rails 3 and 4 are assembled to each other in a manner in which an opening of the U-shape of the upper rail 3 and an opening of the U-shape of the lower rail 4 face each other. An engagement between the bent wall portions 13 of the lower rail 3 and the bent wall portions 16 of the upper rail 4 prevents the upper and lower rails 3 and 4 from separating from each other in the vertical direction. When seen in the cross-sectional view, the lower rail 3 and the upper rail 4 form a rectangular shape, that is, a box shape.

Rollers (not illustrated in the drawings) are provided between each of the bent wall portions 16 and the corresponding side wall portions 11. The upper rail 4 is movably supported relative to the lower rail 3 in the longitudinal direction (in front and rear directions of the vehicle) by a rotational movement (rolling movement) of the rollers between the lower rail 4 and the upper rail 3.

Figure 5:
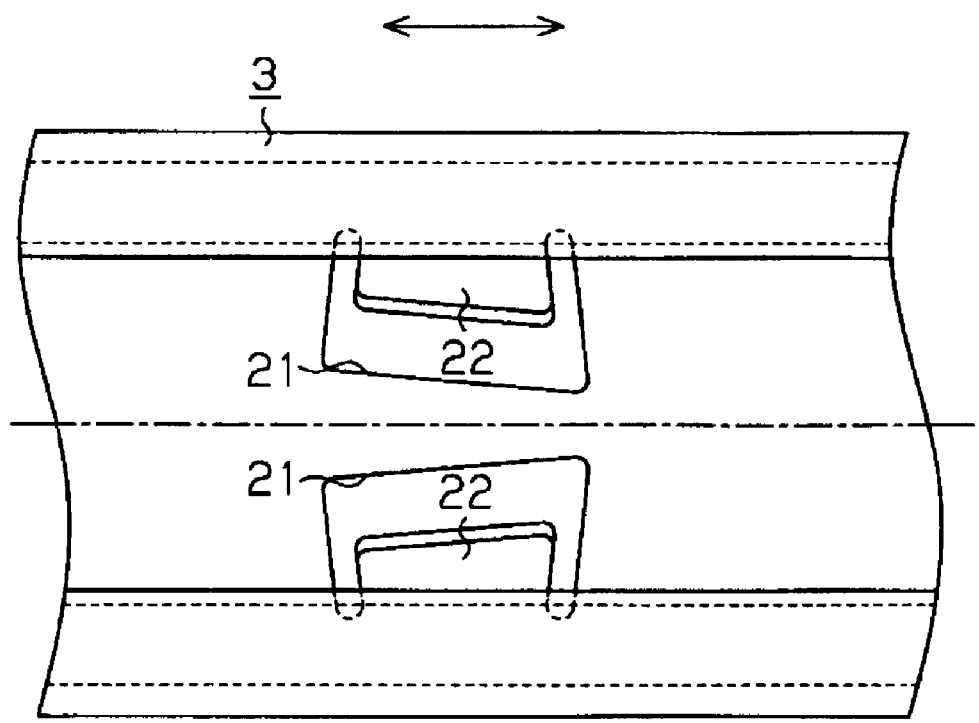
FIG. 5 is a planar view illustrating a lower rail.

As illustrated in FIG. 5, a pair of cutting portions 21 is formed at a longitudinally intermediate portion of the bottom wall portion 12 of the lower rail 3. The cutting portions 21 are U-shaped and open away from each other when seen in the planar view. Further, a pair of first bent portions 22 (serving as first bent portions) is formed at bending the cutting portions 21. More specifically, each of the first bent portions 22 is defined by laterally outward inner wall portions of the corresponding cutting portion 21 and is formed in a rectangular shape when seen in the planar view. The first bent portions 22 extend in the longitudinal direction of the lower rail 3, which is a relative moving direction of the lower rail 3 and the upper rail 4. As illustrated in FIGS. 4A and 4B, each of the first bent portions 22 is bent at a predetermined angle so as to slant inwardly and upwardly. Further, each of the first bent portions 22 is provided to protrude within the rectangle shaped portion formed by the lower rail 3 and the upper rail 4 when seen in the cross section On the other hand, as illustrated in FIG. 4, a pair of second bent portions 23 (serving as second bent portions) is formed at each of front and rear end portions of the upper rail 4 (i.e., at ends in a longitudinal direction of the upper rail 4). Each of the second bent portions 23 is formed by cutting and downwardly bending the connecting portion 16b between the corresponding side wall portion 14 and the bent wall portion 16 (the inclined wall portion 16a). Each of the second bent portions 23 projects along the corresponding inclined wall portion 16a and is bent at a predetermined angle so as to inwardly and downwardly incline. Each of the first bent portions 22 is provided to protrude within the rectangle shaped portion formed by the lower rail 3 and the upper rail 4 when seen in a cross section. As illustrated in FIG. 3, each of the second bent portions 23 extends in the relative moving direction of the lower rail 3 and the upper rail 4.

With reference to FIGS. 3A and 3B, one side surface of the first bent portion 22 is arranged to face a side surface of one second bent portion 23 so as to partly make contact with each other in the relative moving direction of the lower rail 3 and the upper rail 4. In the same manner, another side surface of the first bent portion 22 is arranged to face a side surface of the other second bent portion 23 so as to partly make contact with each other in the relative moving direction thereof. As the lower rail 3 and the upper rail 4 move relative to each other, the first bent portions 22 of the lower rail 3 engage with the second bent portions 23 of the upper rail 4. Thus, a moving distance of the lower rail 3 and the upper rail 4 relative to each other is restricted.

As illustrated in FIGS. 3A, 3B and 4B, a pair of through holes 26 is provided at the intermediate portion of the upper rail 4. Each of the through holes 26 is rectangular shaped and is formed by cutting a connecting portion 16b between the corresponding side wall portion 14 and the bent wall portion 16 (the inclined wall portion 16a) of the upper rail 4. Each of the through hole 26 is arranged to face the corresponding first bent portion 22 when the lower rail 3 and the upper rail 4 are located at a predetermined relative position illustrated in FIG. 3B in the moving direction. In other words the first bent portions are bent at a predetermined relative position of the first and second lower rails 3 and 4 for preventing interference between the first bent portion 22 and the upper rail 4. According to the embodiment, length of the lower and upper rails 3 and 4 are substantially the same. Therefore, when the lower and upper rails 3 and 4 are located at the predetermined relative position, a length of a portion where the lower rail 3 projects from an overlapping portion of the lower rail 3 and the upper rail 4 is arranged to be substantially the same as a length of a portion where the upper rail 4 projects from the overlapping portion thereof. In a case where one of the lower and upper rails 3 and 4 is longer than the other one and when the lower and upper rails 3 and 4 are located at the predetermined relative position, length of front and rear protruding portions of the longer one from the overlapping portion are arranged to be substantially the same.

L1 represents a length of each through hole 26 in the longitudinal direction of the upper rail 4. L2 represents a length of each bent portion 22 in the longitudinal direction of the lower rail 3. L1 is arranged to be longer than L2. Further, as illustrated in FIG. 4B, W1 represents a length between laterally outward inner wall surfaces 26a which are provided at the bent wall portions 16 of the through holes 26. W2 represents a length between bottom ends of the first bent portions 22 in a width direction. W1 is arranged to be longer than W2. Furthermore, H represents a vertical length from a bottom surface of the lower rail 3 to laterally outward inner wall surfaces 26*b*. P represents a length from the bottom ends of the bent portions 22 to the top ends thereof. H is arranged to be longer than P.

In other words, when forming the first bent portions 22 out of the bottom wall portion 12, even though the first bent portions 22 are bent sufficiently to a vertical direction of the bottom portion 12 of the lower rail 3, the first bent portions 22 do not interfere with the inside surfaces of the through holes 26. The first bent portions 22 do not make contact with the upper rail 4, except for the second bent portions 23, in the relative moving direction of the lower rail 3 and the upper rail 4. Therefore, the first bent portions 22 do not make contact with the inside surfaces of the through holes 26.

A manner of forming the first bent portions 22 by upwardly bending out of the bottom wall portion 12 of the lower rail 3 will be described hereinbelow. According to the embodiment, the lower rail 3 and the upper rail 4 at which the second bent portions 23 are formed beforehand are assembled so as to be movable relative to each other before forming the first bent portions 22. Next, the lower rail 3 and the upper rail 4 are located at the predetermined position illustrated in FIGS. 3B and 4B. In such a condition, the bottom wall portion 12 of the lower rail 3 is pressed by a bending mold to form the first bent portions 22. Thus, the first bent portions 22 are upwardly bent.

According to the embodiment, the through holes 26 provided at the upper rail 4 prevent the first bent portions 22 from interfering with the upper rail 4 when forming the first bent portions 22. Even though the lower rail 3 is made of metal, a sufficient degree of bending of the first bent portions 22 is obtained, with allowances for springback Δ when forming the first bent portions 22, as illustrated with a chain double-dashed line in FIG. 4B.

As described above in detail, following effects are obtained according to the embodiment. First, the sufficient degree of bending of the first bent portions 22 is obtained because the through holes 26 are provided at the upper rail 4 so that the first bent portions 22 do not to interfere with the upper rail 4 when forming the first bent portions 22 in a condition in which the lower rail 3 and the upper rail 4 are assembled beforehand so as to be movable relative to each other. Specifically, even though the lower rail 3 is made of metal, the sufficient degree of bending of the first bent portions 22 is obtained with allowance made for the springback Δ when forming. Therefore, an engagement between the lower rail 3 and the upper rail 4 is sufficiently secured and a relative moving distance of the lower rail 3 and the upper rail 4 is surely restricted.

Moreover, when forming the first bent portion 22, the dimensional accuracy is not decreased because the upper rail 4 does not receive a load generated by interference between the bent portions 22 and the upper rail 4. Therefore, a defect such as slide malfunction of the upper and lower rails is prevented from occurring.

Second, according to the embodiment, when forming the first bent portion 22, the through holes 26 formed in a simple structure are provided as relief portions of the upper rail so as to prevent the upper rail 4 from interfering with the first bent portions 22. Further, because the through holes 26 are partly provided at the upper rail 4 so as to face the first bent portions 22 of the lower rail 3 in the predetermined position of the lower rail 3 and the upper rail 4, a deterioration of strength caused by forming the through holes 26 is prevented.

Third, according to the embodiment, when seen in the cross section, the first bent portions 22 and the second bent portions 23 are provided to protrude within the rectangle shape formed by the lower rail 3 and the upper rail 4. Therefore, a space inside the upper and lower rails 3 and 4 is efficiently used, and a space for locating the seat slide apparatus may be flexibly and effectively used.

Additionally, the embodiment mentioned above may be modified as described below. In the predetermined position, the through hole 26 in the above described embodiment that prevents the interference of the bent portions 22 with the upper rail 4 when forming the same may be formed in different shapes, such as a relief portion, or the like, which is partly formed at the upper rail 4 so as to face the first bent portions 22.

In the embodiment described above, the first bent portion 22 is provided between the second bent portions 23 which are respectively provided at the front and rear end portion of the upper rail 4. Alternatively, two first bent portions 22 may be provided between the front and rear second bent portions 23 so as to be longitudinally away from each other. In this case, two relief portions (the through holes 26, or the like) which prevent the first bent portions 22 from interfering with the upper rail 4 when forming the first bent portions 22 may be provided individually for each of the first bent portions 22, respectively, or one relief portion may be shared by moving a distance between two pairs of first bent portions 22.

Further, according to the embodiment described above, two pairs of bent portions 22 may be provided at the front and rear end portions of the lower rail 3, respectively, in the longitudinal direction thereof. In this case, the front and rear second bent portions 23 of the upper rail 4 may be provided between the front and rear first bent portions 22 of the lower rail 3. Further, only one second bent portion 23 may be provided between the front and rear first bent portions 22 of the lower rail 4.

Still further, according to the embodiment described above, the relationship of the vehicle floor 2 and the seat 5 with the lower rail 3 and the upper rail 4 may be inversed. In other words, the lower rail 3 functions as the upper rail 4 and the upper rail 4 functions as the lower rail 3. In this case, the lower rail 3 serves as the second rail and the upper rail 4 serves as the first rail. Thus, the seat 5 may be secured to the lower rail 3 and the vehicle floor 2 may be secured the upper rail 4.

Further more, the cross section of each of the lower rail 3 and the upper rail 4 is not restricted to the U-shape. Alternatively, for example, the cross section of the upper rail 4 may be an inversed T-shape. That is, as long as the first bent portions 22 of lower rail 3 and the second bent portions 23 of the upper rail 4 are assembled in a manner in which an end surface of the first bent portion 22 makes contact with an end surface of the second bent portion 23 in the relative moving direction of the lower rail 3 and the upper rail 4, the cross section of each of the lower rail 3 and the upper rail 4 may be modified.

Still further, one pair of lower rail 3 and upper rail 4 (for the seat slide apparatus for a vehicle) may be provided at the seat 5. Further, more than one set of lower rail 3 and upper rail 4 may be provided at the seat 5.

Further more, as the lower and upper rails move relative to each other, a moving direction of the seat may be, for example, in a width direction of the vehicle.

Furthermore, according to the embodiment, the through-holes 26 are provided at the connecting portions 16*b* so as to prevent the first bent portions 22 from interfering with the upper rail 4 when forming the first bent portion 22. However, the through-holes 26 may be provided at the bottom wall portion 12 of the lower rail 3 so as to prevent the second bent portions 23 from interfering with the lower rail 3 when forming the second bent portion 23. In such a case, each of left and right portions of the bottom wall portions 12 of the lower rail 3 serves as the connecting portion 16a.

Still further, according to the embodiment, as illustrated in FIGS. 4A and 4B, the pair of first bent portions 22 is formed at the left and right portions of the bottom wall portion 12 of the lower rail 3. In the same manner, the pair of second bent portions 23 is provided at the left and right connecting portions 16b of the upper rail 4. However, one first bent portion 22 and one second bent portion 23 may be provided at one of the left and right portions of bottom wall portion 12 and at one of the left and right connecting portions 16b, respectively as long as side surfaces of the pair of first bent portions 22 partly contact side surfaces of the pair of second bent portions 23. With such arrangement, according to the embodiment described above, one of the left and right portions of the base wall portion 12 or one of the left and right connecting portions 16b of the upper rail 4 may be provided with the through-hole 26.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A seat slide apparatus for a vehicle, comprising:
   a first rail adapted to be securely mounted on one of a vehicle floor and a seat;
   a second rail adapted to be securely mounted on the other of the vehicle floor and the seat and movably assembled relative to the first rail;
   a first bent portion formed at the first rail;
   a pair of second bent portions respectively formed at the second rail at longitudinal sides of the first bent portion of the first rail so as to contact the first bent portion to restrict further relative movement of the first and second rail; and
   a relief portion provided at one of the first and second rails so as to face one of the second and first bent portions, wherein the relief portion prevents an interference between one of the first and second rails and the corresponding one of the second and first bent portions when forming one of the second and first bent portions in a condition in which the first and second rails are assembled beforehand so as to be movable relative to each other.

2. The seat slide apparatus for the vehicle according to claim 1, wherein
   one of the first and second bent portions is bent at a predetermined relative position of the first and second rails at which one of the first and second bent portions faces the relief portion for preventing interference between the first bent portion and the second rail or between the second bent portion and the first rail.

3. The seat slide apparatus for the vehicle according to claim 1, wherein
   the relief portion includes a through hole.

4. The seat slide apparatus for the vehicle according to claim 3, wherein
   the first or second bent portions is located at a position facing the through hole when formed.

5. The seat slide apparatus for the vehicle according to claim 3, wherein
   the first rail includes a pair of first side wall portions, a first base wall portion connecting the first side wall portions and having the first bent portion, and a pair of first bent wall portions respectively formed at end portions of the first side wall portions, and wherein
   the second rail includes a pair of second side wall portions provided between the first side wall portions of the first rail, a second base wall portion connecting the second side wall portions, and a pair of second bent wall portions respectively provided at end portions of the second side wall portions, the second bent portion and the through hole formed at a connecting portion between the second bent wall portion and the second side wall portion.

6. The seat slide apparatus for the vehicle according to claim 5, wherein
   the through-hole is provided between the pair of second bent portions of second rail.

7. The seat slide apparatus for the vehicle according to claim 5, wherein
   the first bent portion of the first rail is bent towards the connecting portion of the second rail, and
   the second bent portion of the second rail is bent towards the first base wall portion of the first rail.

* * * * *